United States Patent [19]

Campbell

[11] Patent Number: 4,764,879
[45] Date of Patent: Aug. 16, 1988

[54] FAST/ACCURATE CALIBRATION FOR A PHYSICAL PROPERTY SENSOR

[75] Inventor: James M. Campbell, Yellow Springs, Ohio

[73] Assignee: The Yellow Springs Instrument Company, Inc., Yellow Springs, Ohio

[21] Appl. No.: 67,338

[22] Filed: Jun. 25, 1987

[51] Int. Cl.[4] .............................................. G01R 27/00
[52] U.S. Cl. .................................... 364/482; 364/571; 235/464; 235/472
[58] Field of Search ................ 364/482, 571; 235/464, 235/472

[56] References Cited

U.S. PATENT DOCUMENTS 4,323,972  4/1982  Winter .................................. 364/482

Primary Examiner—Harold I. Pitts
Attorney, Agent, or Firm—Biebel, French & Nauman

[57] ABSTRACT

The unique signal generating characteristics of a sensing transducer are defined by integrally incorporating an encoded form of the characteristics into the sensing transducer such that the encoded characteristics can be read by a data reader incorporated into a signal conditioner used with the sensing transducer. The encoded data is incorporated as an inseparable part of each operable sensing transducer by being molded or otherwise formed into a connecting cable of the sensing transducer or engraved or otherwise formed onto the barrel of a connector plug for interconnecting the transducer to the signal conditioner. The encoded data portion of the cable is passed through a reader externally mounted on the signal conditioner, or the encoded data on the barrel of a connector plug is read as the connector plug is inserted into a connector socket on the signal conditioner.

10 Claims, 1 Drawing Sheet

FAST/ACCURATE CALIBRATION FOR A PHYSICAL PROPERTY SENSOR

BACKGROUND OF THE INVENTION

This invention relates generally to systems for monitoring one or more physical properties, such as temperature or oxygen content by means of sensing transducers which each have unique signal generating characteristics, and more particularly, to an arrangement for quickly and accurately calibrating a signal conditioner to operate with such sensing transducers.

Monitoring systems for sensing temperature, oxygen or other physical properties are well known and used, for example, in the medical field for critical care units. Such systems monitor a physical property by means of a sensing transducer which generates raw signals representative of the physical property. The raw signals are passed to a signal conditioner which is coupled to the sensing transducer, with the signal conditioner converting the raw signals into a human-readable form for use by personnel utilizing the monitoring system.

Some sensing transducers generate sufficiently consistent signals from one transducer to another that they may be readily interchanged upon failure of the transducer or for disposal. However, many other sensing transducers are not readily interchangeable since they have unique signal generating characteristics which must be provided to the signal conditioner for the signal conditioner to accurately process or transform the raw signals from the sensing transducers to an accurate human-readable form.

The problems of associating such noninterchangeable sensing transducers with signal conditioners has plagued designers and users of monitoring systems for years. These problems have been greatly reduced by the development of digital signal conditioning circuitry, such as microprocessors, having memory which can be readily erased and rewritten to contain the unique characteristics of a given sensing transducer. Unfortunately, entering data defining the unique characteristics of a given sensing transducer into a signal conditioner in a quick and convenient manner and free of operator errors remains a problem.

Methods of entering data defining the unique characteristics of a given sensing transducer into the memory of a microprocessor or other circuitry of a monitoring system have included keyboards; magnetic discs, tapes or cards; punched tapes or cards; and, tape or cards including bar codes. All of these prior art data entering techniques are prone to errors and/or inconveniences of one kind or another.

Keyboards are time consuming and highly subject to operator error. Discs, tapes and cards, whether magnetic, punched or bar coded, require some additional object to be associated with the sensor and used when the sensor is coupled to the signal conditioner. Each of these devices is subject to loss or damage in handling. In view of such problems, none of these prior art techniques is attractive for changing a sensing transducer in an environment where speed and accuracy is imperative. Such changes may be required, for example, in an operating room, when the cable interconnecting the sensing transducer to the signal conditioner is inadvertently severed or the transducer otherwise fails.

It is, thus, apparent that the need exists in monitoring systems utilizing sensing transducers having unique signal generating characteristics for an arrangement permitting a signal conditioner to be quickly and accurately calibrated or programmed for accurate operation with a new sensing transducer without the use of a manual keyboard or a separate disc, tape or card which must be associated with the sensing transducer.

SUMMARY OF THE INVENTION

The problems of quickly and accurately entering the unique signal generating characteristics of a sensing transducer into a signal conditioner have been solved in accordance with the present invention by integrally incorporating data means into the sensing transducer for encoding the unique signal generating characteristics and including in the signal conditioner data reader means for reading the encoded data. In this way, data defining the unique signal generating characteristics of a sensing transducer, which data are necessary for the signal conditioner to properly interpret the signals coming from the sensing transducer, are incorporated as an inseparable part of each operable sensing transducer.

In accordance with one aspect of the present invention, apparatus for sensing a physical property comprises a sensing transducer for generating signals representative of the physical property, said signals depending upon unique signal generating characteristics of the transducer. A signal conditioner receives signals from a sensing transducer and processes the signals in accordance with the unique signal generating characteristics such that a usable signal accurately and identifiably reflecting the physical property are generated. Reader means are associated with the signal conditioner for reading encoded data reflecting the unique signal generating characteristics of the sensing transducer being utilized by the signal conditioner, and data means are provided for encoding the unique signal generating characteristics of the sensing transducer, with the data means being integrally incorporated into the sensing transducer such that the signal conditioner can be quickly and accurately adapted to operate with a given sensing transducer by having the reader means read the data means for the given sensing transducer to be utilized.

In accordance with one embodiment of the present invention, the sensing apparatus further comprises connector means for interconnecting the sensing transducer and the signal conditioner, with the connecting means comprising first and second intermating parts. The first part of the connector means is included within the signal conditioner and the second part is integrally incorporated as a part of the sensing transducer. The reader means is associated with the first part of the connector means, and the data means is formed into the second part of the connector means such that the data means is read by the reader means as the first and second parts of the connector means are intermated to interconnect the sensing transducer and the signal conditioner.

In accordance with another embodiment of the present invention, the sensing apparatus comprises connector means for interconnecting the sensing transducer and the signal conditioner and comprising a cable integrally connected to the sensing transducer, with the data means being incorporated into the cable and the reader means being adapted to read the data means as the portion of the cable including the data means is passed thereby. At the present time, the preferred form of the data means comprises a bar code. If practical, the data means could be printed, engraved or otherwise made a physical part of the sensing transducer body.

It is a primary object of the present invention to provide an improved calibration arrangement for rapidly and accurately transferring unique signal generating characteristics of a sensing transducer to a signal conditioner which is to utilize the transducer for sensing a physical property by integrally incorporating data means into the sensing transducer for encoding the unique signal generating characteristics of that transducer, and including data reader means within the signal conditioner such that the unique signal generating characteristics can be passed to the signal conditioner by associating the data means with the data reader means.

Other objects and advantages of the invention will be apparent from the following description, the accompanying drawings and the appended claims.

DETAILED DESCRIPTION OF THE INVENTION

Figure 1:
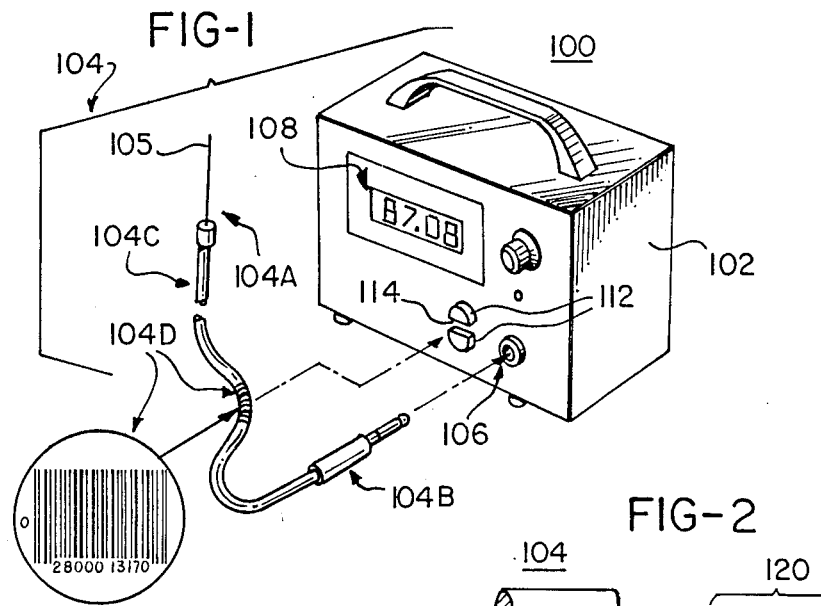
FIG. 1 is a perspective view of a signal conditioner and sensing transducer including the calibration arrangement of the present invention.

While the present invention is generally applicable to systems for monitoring one or more physical properties by means of sensing transducers which each have unique signal generating characteristics, it will be described relative to such a system for monitoring temperature for which the present invention is particularly applicable. A temperature monitoring system 100 is shown in FIG. 1 and comprises a signal conditioner 102 to which a temperature sensing transducer 104 is coupled.

The sensing transducer 104 comprises a hypodermic probe 104A, a connector plug 104B and an integrally formed interconnecting cable 104C. The sensing transducer 104 is placed such that its probe, in this case, the hypodermic probe 104A, extends into a body, the temperature of which is to be monitored. In the case of the hypodermic probe 104A, the sharp needle 105 of the probe is inserted into tissue, the temperature of which is to be monitored.

The hypodermic probe 104A includes a thermistor which varies in resistance as a function of temperature such that the probe 104A when connected to the signal conditioner 102 generates raw signals representative of the probe temperature. The raw signals are transmitted via the integral cable 104C to the connector plug 104B which is inserted into the connector socket 106 of the signal conditioner 102. The connector socket 106 is connected to electrical circuitry internal to the signal conditioner 102 which processes the raw signals into a human-readable form which is displayed on a digital readout 108 for use by personnel utilizing the monitoring system. The circuitry for processing the temperature signals is well known in the art, forms no part of the present invention, and accordingly, will not be further described herein.

The sensing transducer 104 generates raw signals which are dependent upon signal generating characteristics which are unique for each probe/thermistor, and hence, each sensing transducer 104. Since the raw signals generated by the sensing transducer 104 are unique to the probe/thermistor, such unique signal generating characteristics must be passed to the signal conditioner 102 such that the raw signals can be converted by the signal conditioner 102 into a useable signal identifiably reflecting the physical property, in this case, temperature, such that the temperature can be displayed by the digital readout 108.

In the case of such noninterchangeable sensors, each sensor is assigned a serial number and provided with a calibration chart. The calibration chart sets forth the resistances presented by the sensor for a range of temperatures and also a conversion table. The conversion table shows what temperature would be indicated based on a standard sensor, the actual temperature and the differential between the actual temperature and the temperature which would be indicated presuming a standard sensor.

To be able to display the actual temperature of the sensor 104, the signal conditioner 102 must be passed the information contained on the calibration chart. This is normally done by providing the probe resistance at three different temperatures, e.g., 0° C., 40° C. and 70° C., to the signal conditioner which can then use these values in well known equations to calculate the actual temperature from the raw signals generated by the sensor 104. In accordance with the present invention, the signal generating characteristics which are unique for the thermistor of the hypodermic probe 104A, and hence, the sensing transducer 104, e.g., three resistance values, are encoded into data means which are integrally incorporated into the sensing transducer 104.

In the first embodiment of the present invention which is shown in FIGS. 1, 3, 4 and 5, the data means comprises a section of bar code 104D which is incorporated into the cable 104C integrally interconnecting the hypodermic probe 104A to the connector plug 104B. Hence, as long as the sensing transducer 104 is operable, the hypodermic probe 104A, the male connecting plug 104B and the interconnecting cable 104C will comprise an integral unit with the parts inseparable from one another. Of course, if any part of the sensing transducer 104 is separated therefrom, the transducer then becomes inoperable and must be replaced. In the illustrated embodiment of FIGS. 1, 3, 4 and 5, the data means comprising the section of bar code 104D of the cable 104C is preferably formed by being molded or imprinted into the jacket of the cable 104C; however, it also could be formed as a label which is permanently adhesively secured to the cable 104C. Other arrangements for encoding the data into the cable 104C will be suggested to those skilled in the art in view of this disclosure.

Figure 4:
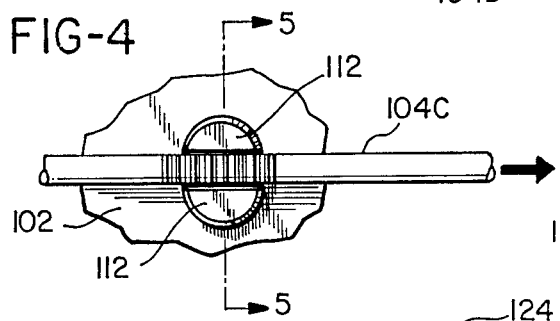
FIG. 4 shows the data means of the transducer of FIG. 3 being read by the reader means of a signal conditioner.
Figure 5:
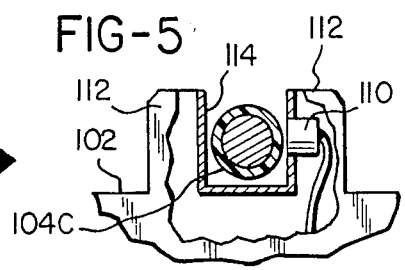
FIG. 5 is a partially sectioned view taken along the view line 5—5 of FIG. 4.
Figure 6:
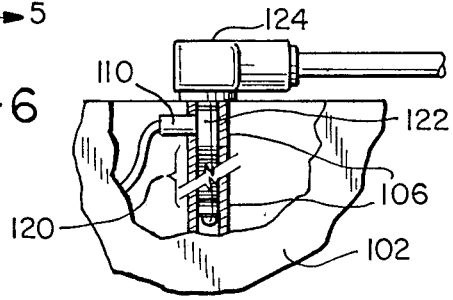
FIG. 6 shows a reader for data means formed onto a connector plug.

Reader means are associated with the signal conditioner 102 for reading the encoded data or section of bar code 104D defining the unique signal generating characteristics of the sensing transducer 104. The reader means comprises an optical reader 110, as shown in FIGS. 5 and 6. In FIGS. 1, 4 and 5, the optical reader 110 is incorporated into a pair of projections 112 which define a channel 114 through which the cable 104C is drawn such that the data means or section of bar code 104D is read by the reader means or optical reader 110 and the unique signal generating characteristics for the sensing transducer 104 are thus passed to the signal conditioner 102.

The reader means can be coupled to digital signal conditioning circuitry, such as a microprocessor or the like, to read the data into a memory for utilization of the sensing transducer 104. A number of optical readers are commercially available and the interconnection and cooperation between the reader means and a memory of digital signal conditioning circuitry, such as a microprocessor, can be performed in a variety of ways which will be apparent to those skilled in the art of such circuitry and will therefore not be described in detail herein. It should be apparent that the data reader 110 can be located in a variety of positions within the channel 114; however, the location in the side wall as shown in FIG. 5 is preferred.

Figure 2:
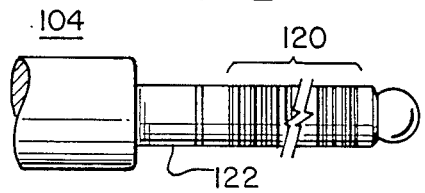
FIG. 2 is a side view of a connector plug having portions broken away illustrating formation of the data means into the plug.
Figure 3:
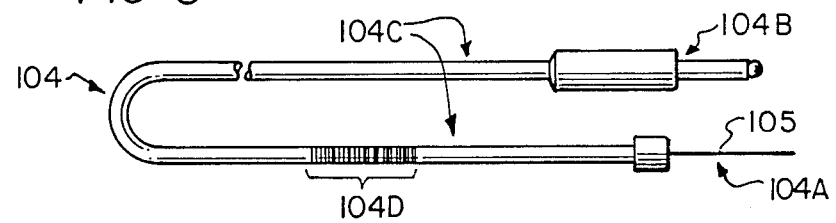
FIG. 3 is a side view of a sensing transducer wherein the data means defining the unique signal generating characteristics of the sensing transducer are formed into a cable which is an integral part of the transducer.

An alternate embodiment of the calibration arrangement in accordance with the present invention is shown in FIGS. 2 and 6 wherein the reader means or optical reader 110 has been associated with the connector socket 106 of the signal conditioner 102. For the embodiment of FIGS. 2 and 6, the data means comprises a bar code 120 which is formed by machining, engraving or the like, the barrel 122 of the connector plug 104B, with an alternate form of connector plug 124 being shown in FIG. 6. For this embodiment, the data reader 110 reads the data means or bar code 120 as the connector plug 104 or 124 is inserted into the connector socket 106.

From the above description, it is apparent that an improved calibrating arrangement has been disclosed for entering the unique signal generating characteristics of a sensing transducer into a signal conditioner by integrally incorporating data means into the sensing transducer such that the data means can be read by reader means included within the signal conditioner. The calibration arrangement in accordance with the present invention eliminates any requirement of manually keying data into the signal conditioner, or the provision of a separate disc, tape or card which must be associated with the sensing transducer for passing its unique signal generating characteristics to a signal conditioner. Various alterations and alternate embodiments of the invention will be apparent to those skilled in the art in view of the above disclosure. For example, the data means could be printed, engraved or otherwise made a physical part of the sensing transducer body for other probe configurations, such as catheter probes or the like.

Accordingly, while the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. Apparatus for sensing a physical property comprising:
    a sensing transducer for generating signals representative of the physical property, said sensing transducer having unique signal generating characteristics;
    a signal conditioner for receiving said signals from said sensing transducer and processing said signals in accordance with said unique signal generating characteristics to generate a usable signal identifiably reflecting said physical property;
    reader means associated with said signal conditioner for reading encoded data; and
    data means for encoding said unique signal generating characteristics of said sensing transducer, said data means being integrally incorporated into said sensing transducer whereby said signal conditioner can be quickly and accurately adapted to operate with a given sensing transducer by having said reader means read said data means for said given sensing transducer.

2. Apparatus as claimed in claim 1 further comprising connector means for interconnecting said sensing transducer and said signal conditioner and comprising first and second intermating parts, said first part being included within said signal conditioner and said second part being integrally incorporated as a part of said sensing transducer, said reader means is associated with said first part, and said data means is formed into said second part whereby said data means is read by said reader means as said first and second parts are intermated to interconnect said sensing transducer and said signal conditioner.

3. Apparatus as claimed in claim 2 wherein said data means comprises a bar code.

4. Apparatus as claimed in claim 1 further comprising connector means for interconnecting said sensing transducer and said signal conditioner and comprising a cable integrally connected to said sensing transducer, said data means is incorporated into said cable, and said reader means is adapted to read said data means as said data means is passed thereby.

5. Apparatus as claimed in claim 4 wherein said data means comprises a bar code.

6. In a monitoring system for sensing a physical property including a sensing transducer for generating signals representative of the physical property and having unique signal generating characteristics, and a signal conditioner for receiving said signals from said sensing transducer and processing said signals in accordance with said unique characteristics to generate a usable signal identifiably reflecting said physical property, calibration apparatus comprising:
    data reader means associated with said signal conditioner for reading encoded data; and
    data means for encoding said unique signal generating characteristics of said sensing transducer, said data means being integrally incorporated into said sensing transducer whereby said signal conditioner can be quickly and accurately adapted to operate with a given sensing transducer by associating said data means for said given sensing transducer with said reader means such that said unique signal generating characteristics for said sensing transducer are passed to said signal conditioner.

7. A monitorng system for sensing a physical property as claimed in claim 6 wherein said system further comprises connector means for interconnecting said sensing transducer and said signal conditioner and comprising first and second intermating parts, said first part being included within said signal conditioner and said second part being integrally incorporated as a part of said sensing transducer, said reader means being associated with said first part and said data means being formed into said second part whereby said data means is read by said reader means as said first and second parts are intermated to interconnect said sensing transducer and said signal conditioner.

8. A monitoring system for sensing a physical property as claimed in claim 6 wherein said data means comprises a bar code.

9. A monitoring system for sensing a physical property as claimed in claim 6 wherein said system further comprises connector means for interconnecting said sensing transducer and said signal conditioner and comprising a cable integrally connected to said sensing transducer, said data means is incorporated into said cable, and said reader means is adapted to read said data means as said data means is passed thereby.

10. A monitoring system for sensing a physical property as claimed in claim 9 wherein said data means comprises a bar code.

* * * * *